SYSTEM FOR RECORDING OPERATIONAL FAILURE HISTORY

Filed May 24, 1965

INVENTORS
DOUGLAS A. MOORE
MARTIN P. FOLAN
BY Edward A. Sokolski
ATTORNEY

United States Patent Office 3,471,652

Patented Oct. 7, 1969

3,471,652

SYSTEM FOR RECORDING OPERATIONAL FAILURE HISTORY

Douglas A. Moore, Rolling Hills, and Martin P. Folan, Gardena, Calif., assignors to Northrop Corporation, Beverly Hills, Calif., a corporation of California Filed May 24, 1965, Ser. No. 458,153
Int. Cl. G11b *13/00;* G01d *15/02;* G08b *29/00*
U.S. Cl. 179—100.1 9 Claims

ABSTRACT OF THE DISCLOSURE

Means are provided for recording the outputs of an audio warning system, which contain failure information, on a first channel of an audio tape recorder. Timing signals generated in a timer unit are simultaneously recorded on a second recorded channel. At times when the warning information is being recorded on the first channel, a signal is fed from the warning system to drive the tape transport system of the recorder at normal voice recording speed. A timer unit provides driving pulses both for the tape transport system and the timing signals recorded on the second channel. In the absence of warning information, these driving pulses are utilized to drive the tape transport at a relatively low frequency and speed, the timing signals being recorded between successive tape movements. In this manner, the actual monitoring time information is condensed on the tape, with only the warning messages themselves being played at normal voice recording speeds.

Figure 1:
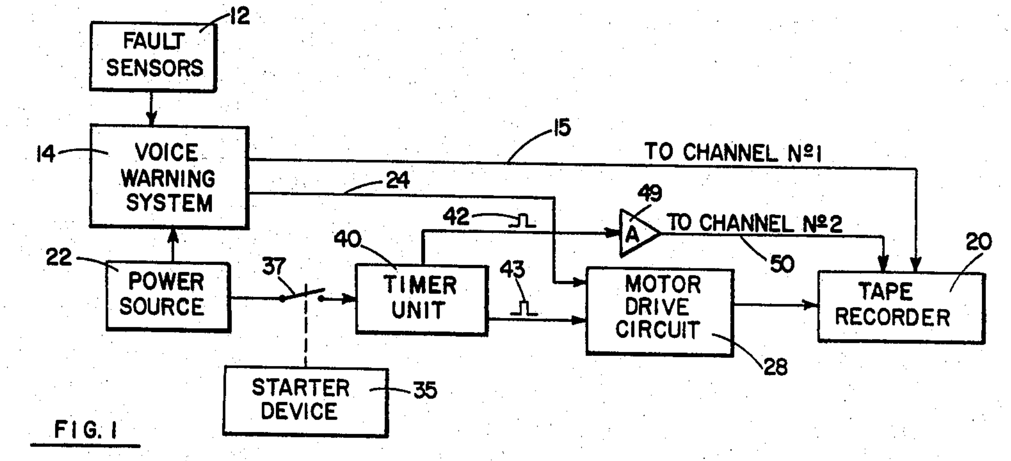

This invention relates to a system for recording operational failure history, and more particularly to such a system which provides a record of malfunctions sensed by a detection system in the time relationship in which they have occurred.

In Patent No. 3,015,702, issued Jan. 2, 1962, to A. R. Vogel et al., and assigned to Northrop Corporation, an audio warning system is described which produces audio messages indicative of malfunctions in various equipments and operational parameters being monitored. This system is useful, for example, in keeping the pilot of an aircraft continually apprised of malfunctions as they occur so that he can take the necessary corrective action. The information on such malfunctions, and data as to the time of their occurrence, is of great value not only for repair and maintenance of the particular equipment involved, but also in the compilation of information for use in determining necessary equipment modifications and in improving the design of new equipment. Experience has indicated that it is difficult to accurately obtain such information from the flight personnel, due to their failure to take proper notes or properly recollect the details involved. Further, when such information is obtained from personnel, it must be compiled, which involves an extra burden of work. Another drawback of such manual compilation is the introduction of the human error function.

The device of this invention eliminates the short-comings set forth above by providing means for continuously recording the failure information as it occurs and the relative time of such occurrence. The information is recorded in such a manner that the performance during a long operation can be played back in a relatively short period of time, thereby greatly facilitating the appraisal of the failures encountered. The performance information is recorded in a form relatively easy to store and utilize either for direct playback or in data processing equipment. Thus, accurate information on the performance of equipment is continuously recorded throughout each operation, without any reliance being placed on the operating personnel to furnish such information.

This end result is achieved in the system of this invention by recording the outputs of an audio warning system, such as that described, for example, in the aforementioned Patent No. 3,015,702, on a first channel of a recorder. Timing signals generated in a timer unit are simultaneously recorded on a second recorder channel. While the warning information is recorded on the first channel, a signal is fed from the voice warning system to drive the tape transport mechanism at normal voice recording speed. Timer unit means is provided to generate driving pulses for the recorder transport mechanism and timing pulses for recordation on the second channel. The timing pulses are spaced between the transport mechanism drive pulses so that they are recorded in between successive movements of the tape, such movements being at a relatively low frequency and relatively low speed. Thus, very little of the tape is used up in the time intervals between the periods when voice warning signals are being fed to the first channel. In this manner, in both recording and playback, the actual time of monitoring is condensed on the tape, with only the warning messages themselves being played in actual time. This minimizes the amount of tape utilized and enables relatively rapid playback of the recorded information.

It is therefore an object of this invention to provide an improved system for obtaining equipment failure information in which such information is recorded along with information indicative of the time of occurrence of failures involved.

It is another object of this invention to provide means for accurately recording equipment failure information.

It is a further object of this invention to obviate the necessity for operating personnel to provide equipment failure information.

It is still a further object of this invention to automatically gather equipment failure information in a form suitable for data processing.

It is still a further object of this invention to provide an improved system for automatically making a record of equipment failures in which such information is condensed for rapid playback.

Other objects of this invention will become apparent from the following description taken in connection with the accompanying drawings, of which FIG. 1 is a block diagram of a preferred embodiment of the device of the invention.

Figure 2:
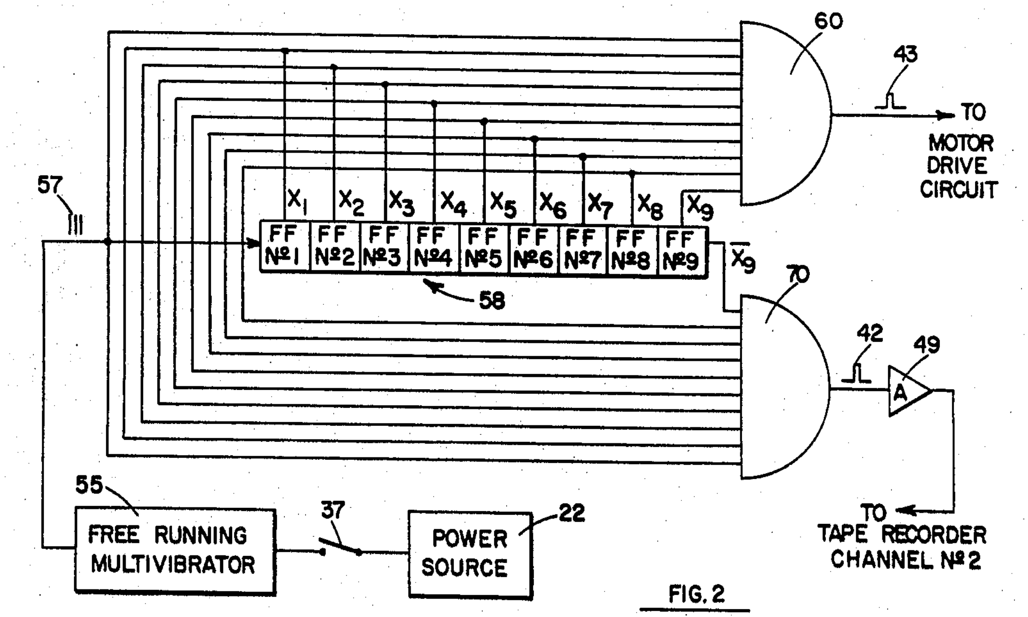
Figure 3:
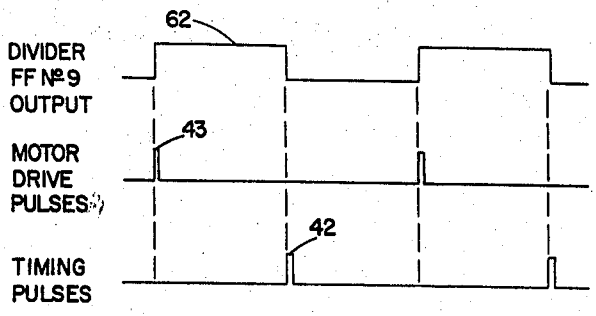

FIG. 2 is a schematic drawing illustrating a timer unit which may be utilized in the device of the invention, and FIG. 3 is a drawing illustrating various pulses generated in the time unit illustrated in FIG. 2.

Referring now to FIG. 1, a block diagram of a preferred embodiment of the device of the invention is shown. Fault sensors 12, capable of sensing failures in various equipments which are being monitored, detect such failures and provide an indication thereof to voice warning system 14. Sensors 12 and voice warning system 14 may be of the type described in aforementioned Patent No. 3,015,702 or any other suitable system providing the necessary voice information. Thus, for each failure sensed by one of fault sensors 12, an audio message is provided to members of the flight crew from voice warning system 14. Each time such a message is delivered, it is fed from voice warning system 14 on line 15 to recording channel #1 of tape recorder 20, and is thus recorded on this channel. Whenever a message output is fed from voice warning system 14 to line 15, a switching device (not shown) in warning system 14 is simultaneously actuated to connect power from power source 22 to line 24. Line 24 is connected to motor drive circuit 28 and thus motor drive power is provided to this circuit whenever there is an output from the voice warning system. Motor drive circuit 28 is connected to drive the tape drive motor (not shown) of tape recorder 20.

The timing operation is initiated by means of starter device 35, which may operate in response to the take-off of the aircraft, e.g., in response to the aircraft wheel retraction mechanism. Starter device 35 operates to close the contact of switch 37, thereby providing power from power source 22 to timer unit 40. When timer unit 40 is thus energized, it commences to produce timing pulses 42 and motor drive pulses 43 at a predetermined regular rate. Pulses 43 are fed to motor drive circuit 28 to provide pulsating drive for the tape drive motor of tape recorder 20. Pulses 42 are amplified by amplifier 49 and fed on line 50 to channel #2 of tape recorder 20 where they are recorded. Thus, motor drive circuit 28 is driven both by the steady state drive signals fed thereto on line 24 and drive pulses 43 fed thereto from timing unit 40. In an operative embodiment of the device of the invention, timing pulses 42 and motor drive pulses 43 are spaced at one minute intervals and motor drive pulses 43 each drive the tape about one-fifth inch. Thus, it can be seen that in the absence of malfunction information on line 15, very little of the tape is used up in recording the one-minute spaced timing pulses 42 on tape recorder channel #2. However, as soon as any voice warning information is received on line 15, the tape immediately assumes normal voice recording speed to enable recordation of such information on channel #1, the timing pulses 42, of course, still being recorded on channel #2.

Referring now to FIG. 2, a schematic drawing of a suitable timer unit 40, which may be utilized in the device of the invention, is shown. When switch 37 is closed, power is fed from power source 22 to actuate free-running multivibrator 55. Free-running multivibrator 55 may be designed to have an output frequency of the order of nine cycles per second. The output pulses 57 of multivibrator 55 are fed to divider 58, which includes a plurality of cascaded flipflop stages (FF#1–FF#9). Flipflop stages FF#1–FF#9 operate to successively divide the input signal by two; thus all nine stages divide the output of free-running multivibrator 55 by 512 times. The output of free-running multivibrator 55 and the outputs $X_1$–$X_9$ of all of the flipflops are fed to AND gate 60. AND gate 60 produces an output pulse 43 to the motor drive circuit only when all of the indicated inputs thereto are present. A logical analysis will indicate that this condition is only satisfied at the beginning of each cycle of the FF#9 output of divider 58 and for the duration of a single pulse output of multivibrator 55. Thus, by reference to FIG. 3, it can be seen that motor drive pulses 43 are generated at the commencement of the positive going half-cycle of the FF#9 output 62, and if square wave 62 has a frequency of one pulse per minute, pulses 43 will have this same frequency. Pulses 43, however, have a pulse width equal to that of the pulses 57 arriving from multivibrator 55.

The output of multivibrator 55 and the outputs of FF#1–FF#9 of counter 58 are fed to AND gate 70. The logical circuitry of AND gate 70 is designed to generate timing pulses 42, which just as motor drive pulses 43, have the duration of the output pulses of multivibrator 55, but coincide with the commencement of the negative half-cycle of square wave 62 rather than the positive half-cycle thereof. To achieve this end result, AND gate 70 is designed to generate a timing pulse 42 only when the outputs $X_1$–$X_8$ of FF#1–FF#8 respectively are present along with an output pulse 57 of multivibrator 55 and the output of FF#9 is not present (i.e., $\overline{X}_9$). A logical analysis will indicate that the output 42 of AND gate 70 is, as indicated in FIG. 3, a positive going pulse having the time duration of the output pulses of free-running multivibrator 55 which occurs at the commencement of the negative half-cycle of square wave 62. Thus, by logical gating techniques, signals having the pulse width of free-running multivibrator 55 and occuring at the commencement of the positive and negative half-cycles of the lowest frequency output are generated.

The device of this invention thus provides simple yet highly effective means for recording the performance of various equipments during a flight or other operation. A record indicating not only the sequence but the time, relative to the start of the operation, when the fault occurred is obtained. This information is condensed on the tape so that in most instances the failures which occur during an operation of several hours duration can be played back in a matter of minutes. Information, further, is in suitable form for utilization in data processing equipment.

While the device of the invention has been described and illustrated in detail, it is to be clearly understood that this is intended by way of illustration and example only and is not to be taken by way of limitation, the spirit and scope of this invention being limited only by the terms of the following claims.

We claim:

1. A system for recording operational failure history comprising sensor means for sensing predetermined operational conditions, a voice warning system connected to receive outputs of said sensor means for generating voice warning signals in response thereto, timer means for generating timing pulses and motor drive pulses having predetermined relatively long time intervals therebetween, recorder means having first and second recording channels, the first of said channels being connected to said voice warning system to record the voice warning outputs thereof, the second of said channels being connected to said timer means to record the timing pulse output thereof, and motor drive circuit means for providing motor drive for said recorder means, said motor drive circuit means being connected to said timer means to provide a pulsed output in response to said motor drive pulses and to said voice warning system to provide a steady output in response to said voice warning system when said voice warning system is generating warning signals.

2. The system as recited in claim 1 and additionally including starter means for initiating the timing action of said timer means in response to a predetermined operational starting condition.

3. A system for recording operational failure history comprising fault sensor means for sensing predetermined malfunctions, a voice warning system connected to receive outputs of said fault sensor means for generating voice warning signals in response thereto, a power source connected to said voice warning system, timer means for generating timing pulses and motor drive pulses having a predetermined relatively long time interval therebetween, said timing pulses being spaced between said motor drive pulses, recorder means having first and second recordings channels, the first of said channels being connected to said voice warning system to record the voice warning outputs thereof, the second of said channels being connected to said timer means to record the timing pulse output thereof, and motor drive circuit means for providing pulsating motor drive for said recorder means in response to said motor drive pulses and steady motor drive for said recorder means in response to said power source when voice warning signals are being generated.

4. In combination, a voice warning system, a power source connected to said voice warning system, a tape recorder having first and second recording channels, means for connecting the voice output of said warning system to said first recording channel motor drive circuit means for generating tape motor drive signals for said tape recorder, timer unit means for generating timing pulses and motor drive pulses spaced at predetermined time intervals, means for connecting said power source to said timer unit to energize said timer unit at a predetermined starting time, means for feeding said timing pulses to the second recording channel of said tape recorder, means for connecting power from said warning system to said motor drive circuit when said warning system is generating a voice output, and means for feeding said motor drive pulses to said motor drive circuit, whereby said tape recorder tape drive is driven in response to said motor drive pulses at all times and in response to said power source only when said voice warning system is generating a voice output.

5. In combination, a voice warning system, a power source connected to said voice warning system, recorder means having first and second recording channels, means for connecting the voice output of said warning system to said first recording channel, motor drive circuit means for generating tape motor drive signals for said recorder means, timer unit means for generating timing pulses and motor drive pulses spaced at predetermined time intervals, said timing pulses being spaced between said motor drive pulses, means for connecting said power source to said timer unit to energize said timer unit at a predetermined starting time, means for feeding said timing pulses to the second recording channel of said recorder means, means for connecting power from said warning system to said motor drive circuit when said warning system is generating a voice output, and means for feeding said motor drive pulses to said motor drive circuit, whereby said recorder means drive is driven in response to said motor drive pulses at all times and in response to said power source only when said voice warning system is generating a voice output.

6. In a system for recording equipment operational failure information, fault sensor means for detecting predetermined equipment malfunctions, a voice warning system connected to receive the output of said fault sensor means for generating voice warning signals in response thereto, a recorder having first and second recording channels, the voice warning outputs of said voice warning system being fed to said first recording channel for recording thereon, timer means for generating timing pulses and drive pulses at a predetermined relatively long time interval, said timing pulses being fed from said timer means to said second recording channel for recording thereon, a power source connected to said voice warning system, and drive means for actuating the recording channels of said recorder, said voice warning system connecting said power source to said drive means when said voice warning system is generating voice warning signals, the drive pulses being fed from said timer means to said drive means, whereby said drive means drives said recorder at normal voice recording speed when voice warning signals are present and at a greatly reduced speed in the absence of such warning signals when only drive pulses are present.

7. The system as recited in claim 6 wherein said timer means spaces said timing pulses between said drive pulses.

8. In a system for recording equipment operational failure information, fault sensor means for detecting predetermined equipment malfunctions, a voice warning system connected to receive the output of said fault sensor means for generating voice warning signals in response thereto, a recorder, the voice warning outputs of said voice warning system being fed to said recorder, timer means for generating timing pulses and drive pulses at a predetermined relatively long time interval, said timing pulses being fed from said timer means to said recorder for recording, a power source connected to said voice warning system, and drive means for actuating said recorder, said voice warning system connecting said power source to said drive means when said voice warning system is generating voice warning signals, the drive pulses being fed from said timer means to said drive means, whereby said drive means drives said recorder at normal voice recording speed when voice warning signals are present and at a greatly reduced speed in the absence of such warning signals when only drive pulses are present.

9. A system for recording operational failure history comprising:

sensor means for sensing predetermined operational conditions, a voice warning system connected to receive outputs of said sensor means for generating voice warning signals in response thereto, timer means for generating timing pulses and motor drive pulses having predetermined relatively long time intervals therebetween, said timer means comprising a free running multivibrator, divider means having a plurality of divide by two stages and first AND gate means for producing timing pulses when the outputs of said multivibrator and of all the stages of said divider means are present and second AND gate means for producing motor drive pulses when the outputs of said multivibrator and the outputs of all but the last stage of said divider means are present, a recorder means having first and second recording channels, the first of said channels being connected to said voice warning system to record the voice warning outputs thereof, the second of said channels being connected to said timer means to record the timing pulse output thereof, and motor drive circuit means for providing motor drive for said recorder means, said motor drive circuit means being connected to said timer means to provide a pulsed output in response to said motor drive pulses and to said voice warning system to provide a steady output in response to said voice warning system when said voice warning system is generating warning signals.

References Cited

UNITED STATES PATENTS

| | | | |
|---|---|---|---|
| 3,015,702 | 1/1962 | Vogel et al. | 179—100.2 |
| 3,059,235 | 10/1962 | Sammis et al. | 346—136 X |
| 3,372,240 | 3/1968 | Boyers et al. | 179—100.2 |

BERNARD KONICK, Primary Examiner

R. F. CARDILLO, Jr., Assistant Examiner

U.S. Cl. X.R.

340—221; 346—136